United States Patent
Dikhit et al.

(10) Patent No.: US 12,217,252 B2
(45) Date of Patent: *Feb. 4, 2025

(54) HYBRID IDENTITY AS A SERVICE FOR DECENTRALIZED BROWSER BASED WALLETS

(71) Applicant: American Express Travel Related Services Company, Inc., New York, NY (US)

(72) Inventors: Jitendra Singh Dikhit, Bangalore (IN); Alaric M. Eby, Phoenix, AZ (US); Andras L. Ferenczi, Scottsdale, AZ (US); Ashish Kumar, Gunjurpalya Bangalore (IN); Upendra Mardikar, Fremont, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,519

(22) Filed: Dec. 6, 2023

(65) Prior Publication Data
US 2024/0104563 A1      Mar. 28, 2024

Related U.S. Application Data

(63) Continuation of application No. 16/239,017, filed on Jan. 3, 2019, now Pat. No. 11,887,112.

(51) Int. Cl.
*G06Q 20/38*      (2012.01)
*G06Q 20/40*      (2012.01)

(52) U.S. Cl.
CPC ..... *G06Q 20/3829* (2013.01); *G06Q 20/3827* (2013.01); *G06Q 20/4014* (2013.01); *G06Q 2220/00* (2013.01)

(58) Field of Classification Search
CPC ................... G06Q 20/00–425; H04L 9/00–50
See application file for complete search history.

(56) References Cited

U.S. PATENT DOCUMENTS

| | | | | |
|---|---|---|---|---|
| 2007/0266258 | A1* | 11/2007 | Brown | H04L 63/00 713/183 |
| 2007/0269041 | A1* | 11/2007 | Bhatnagar | H04L 63/061 380/30 |
| 2013/0263235 | A1* | 10/2013 | Daigle | G06F 21/35 726/2 |
| 2016/0292943 | A1* | 10/2016 | Ranchod | E05B 47/0603 |
| 2016/0342989 | A1* | 11/2016 | Davis | H04L 9/50 |
| 2022/0027491 | A1* | 1/2022 | Wright | H04L 9/3242 |

* cited by examiner

*Primary Examiner* — Ari Shahabi
(74) *Attorney, Agent, or Firm* — Thomas Horstemeyer, LLP

(57) ABSTRACT

Disclosed are various embodiments for a service for decentralized browser based wallets. Various embodiments of the present disclosure can receive a first passcode and a second passcode from a security provider device. Various embodiments can use a cryptowallet to decrypt a first encrypted private key using the first passcode to generate a decrypted private key. Various embodiments can use a cryptowallet to sign a transaction request with the decrypted private key. Various embodiments can use a cryptowallet to generate a second encrypted private key by encrypting the decrypted private key using the second passcode.

20 Claims, 3 Drawing Sheets

HYBRID IDENTITY AS A SERVICE FOR DECENTRALIZED BROWSER BASED WALLETS

CROSS-REFERENCE TO RELATED APPLICATIONS

This application is a continuation of, and claims priority to and the benefit of, co-pending U.S. patent application Ser. No. 16/239,017, entitled "HYBRID IDENTITY AS A SERVICE FOR DECENTRALIZED BROWSER BASED WALLETS" and filed on Jan. 3, 2019, which is incorporated by reference as if set forth herein in its entirety.

FIELD

This disclosure generally relates to services for managed encryption of passcodes for private key storage.

BACKGROUND

Browser based cryptographic currency wallets ("crypto-wallets") generate a private key which may be used to authorize transactions on a blockchain. These crypto-wallets often store private keys within the browser's local data store. To encrypt and decrypt the private keys for transaction purposes, a user may provide a strong passcode to the crypto-wallet. The crypto-wallet may include a mechanism enabling the user to alter the passcode at any time in response to a user request (i.e., a passcode change request). However, user initiated requests to alter the passcode tend to be time-consuming and demand a number of user inputs and, therefore, may be infrequent. As such, a technical problem exists in that the security of browser based crypto-wallets may be degraded as a function of the duration of the passcode between change requests.

SUMMARY

A system, method, and computer readable medium (collectively, the "system") is disclosed for a hybrid identity service system for browser based crypto-wallets. The system may receive a transaction request. The system may generate a first passcode and a second passcode. The system may decrypt a first encrypted private key with the first passcode to recover a private key. The system may sign the transaction request with the private key and may encrypt the private key with the second passcode to generate a second encrypted private key.

In various embodiments, the system may receive an account creation request including a user ID, a password, and an account creation information. The system may hash the user ID and password to produce a password hash and may store the password hash in a repository as a stored password hash. The system may associate the stored password hash with the account creation information. In various embodiments, the system may hash the account creation information to generate a hashed account information and may generate the first passcode in response to the hashed account information. The system may encrypt the first passcode as a function of the hashed account information to generate a first encrypted passcode.

In various embodiments, the system may store the first encrypted passcode in the repository and may associate the first encrypted passcode with one of the hashed account information or the password hash. The system may compare the password hash and the stored password hash and may determine a match based on the comparison. The system may decrypt the first encrypted passcode in response to the match. The system may encrypt the second passcode to generate a second encrypted passcode, wherein the second passcode is generated in response to decrypting the first encrypted passcode. In various embodiments, the system may transmit a security provider plugin in response to the account creation request. In various embodiments, the account creation information comprises one of a name, a street address, a phone number, or an email address.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

Figure 1:
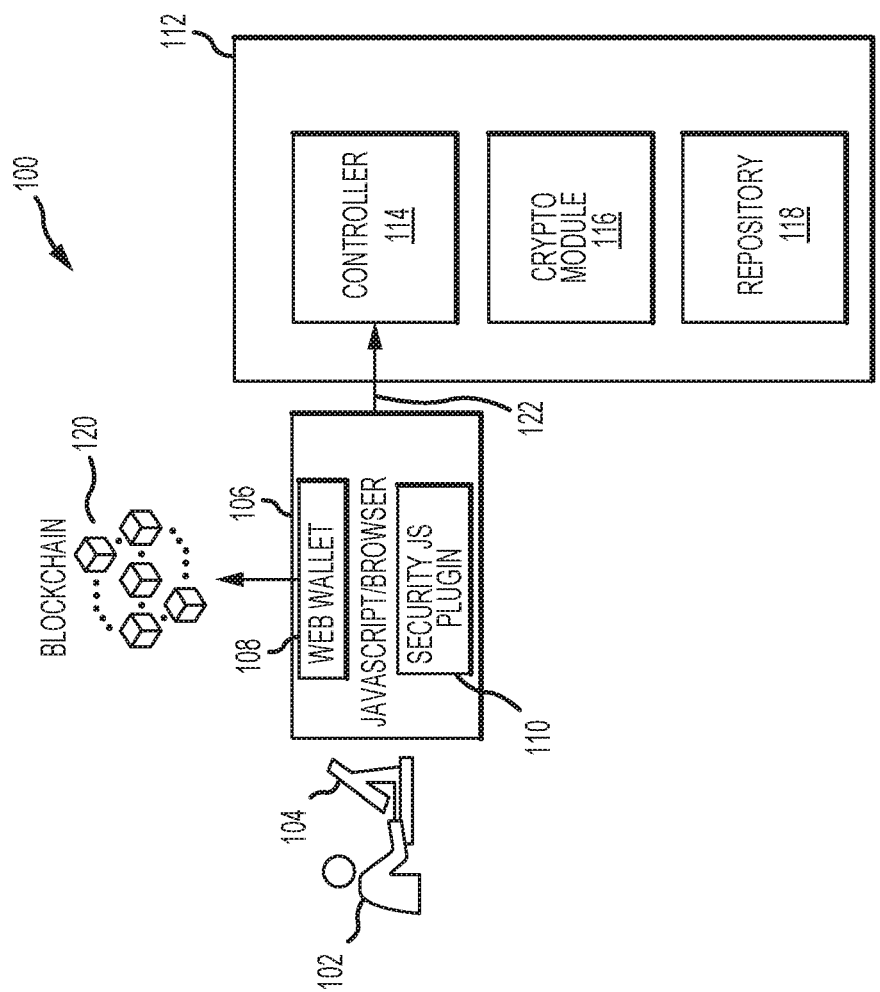
FIG. 1 is an exemplary block diagram illustrating a hybrid identity service system, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The hybrid identity service system may be used to facilitate transactions between parties using a blockchain. While prior art systems typically include the problem of demanding user initiated passcode change requests, the current system provides a technical solution by connecting the user to a security provider system which may autonomously manage passcodes via a security provider plugin to the crypto-wallet. In this regard, the system may improve transaction security and passcode security by regularly altering the pass code.

The systems described herein, in accordance with various embodiments, may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system (e.g., transactions) may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

This process improves the functioning of the computer. For example, the process automates passcode generation, thereby enabling an increased passcode complexity and a unique passcode for each transaction. In this regard, by transmitting, storing, and accessing data using this processes, the security of the data is improved and fraud is reduced, which decreases the risk of the computer or network from being compromised. Such improvements also increase the efficiency of the network by reducing the portion of transaction volume comprising fraudulent transactions. The process may improve the customer experience by reducing customer workload and memory allocated to passcode storage.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

With reference to FIG. 1, a system 100 for hybrid identity service is depicted according to various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, system 100 may comprise a user 102 (e.g., a cardholder), a user device 104 (e.g., a cardholder device), a browser 106 including a browser based crypto-wallet 108 and a security provider plugin 110, a security provider system 112, and a blockchain network 120. Blockchain network 120 may be in electronic communication with user device 104 via crypto-wallet 108.

Blockchain network 120 may be configured to maintain a blockchain, in accordance with various embodiments. Blockchain network 120 may be a peer-to-peer network that is private, federated, and/or public in nature (e.g., the ETHEREUM® system, the Bitcoin system, the HYPERLEDGER® Fabric system, etc.). Federated and private networks may offer improved control over the content of the blockchain and public networks may leverage the cumulative computing power of the network to improve security. Blockchain network 101 may comprise various blockchain nodes (e.g., consensus participants) in electronic communication with each other, as discussed further herein. Each blockchain node may comprise a computing device configured to write blocks to the blockchain and validate blocks of the blockchain. The computing devices may take the form of a computer or processor, or a set of computers and/or processors or application specific integrated circuits (ASICs), although other types of computing units or systems may also be used. Exemplary computing devices include servers, pooled servers, laptops, notebooks, hand held computers, personal digital assistants, cellular phones, smart phones (e.g., an IPHONE® device, a BLACKBERRY® device, an ANDROID® device, etc.), tablets, wearables (e.g., smart watches and smart glasses), Internet of Things (IOT) devices, or any other device capable of receiving data over network. Each computing device may run applications to interact with blockchain network 101, communicate with other devices, perform crypto operations, and otherwise operate within system 100. Computing devices may run a client application that can be a thin client (web), hybrid (i.e. web and native, such as iOS and ANDROID® systems), or native application to make API calls to interact with the blockchain, such as a web3 API compatible with blockchain databases maintained by the ETHEREUM® system.

The blockchain may be based on any blockchain technology such as, for example, ETHEREUM®, OPENCHAIN®, Chain Open Standard technology, HYPERLEDGER® Fabric, CORDA®, Connect™, Sawtooth™, etc. The blockchain may comprise a system of blocks containing data that are interconnected by reference to the previous block. Each block may link to the previous block and may include a timestamp. Data can be added to the blockchain by establishing consensus between the blockchain nodes based on proof of work, proof of stake, practical byzantine fault tolerance, delegated proof of stake, or other suitable consensus algorithms. When implemented in support of system 100, the blockchain may serve as an immutable log for transactions and related contracts and processes.

A blockchain address may be uniquely assigned to each blockchain node or participant to function as a unique identifier for each participant in blockchain network 120. For example, each participant may register with blockchain network 120, and/or an existing trust participant (e.g., identity provider), and may be assigned and provided a private key and public key pair. In various embodiments, blockchain network 120 may use a Hierarchical Deterministic (HD) solution to enable the creation of one or more child keys from one or more parents keys in a hierarchy. Each child key may be assigned to a participant in blockchain network 120. For example, blockchain network 120 may use BIP32, BIP39, and/or BIP44 to generate an HD tree of public addresses.

In various embodiments, user device 104 may enable user 102 to interact with system 100 to register with the hybrid identity service, view content, initiate transactions, and/or the like. User device 104 may comprise any suitable combination of hardware, software, and/or database components. For example, user device 104 may comprise at least one computing device in the form of a computer or processor, or a set of computers/processors, although other types of computing units or systems may be used. The processor may be configured to implement various logical operations in response to execution of instructions, for example, instructions stored on a non-transitory, tangible, computer-readable medium, as discussed further herein. For example, user device 104 may comprise a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. User device 104 may comprise an operating system, such as, for example, a WINDOWS® mobile operating system, an ANDROID™ operating system, APPLE® IOS®, a BLACKBERRY® operating system, and the like.

In various embodiments, user device 104 may run applications to interact with blockchain network 120 and security provider system 112. User device 104 may run a client application that can be a thin client (web), a hybrid (i.e., web and native, such as iOS and Android), or a native application to make application programming interface (API) calls to interact with blockchain network 120 and security provider system 112, such as a web3 API compatible with blockchain databases maintained by ETHEREUM® and/or the like. In various embodiments, user device 104 comprises a browser 106 such as, for example, a JavaScript based browser including a crypto-wallet 108 configured to communicate with blockchain network 120. Browser 106 may also include security provider plugin 110 configured to communicate with security provider system 112. The aforesaid elements may be in direct logical communication with each other via a bus, network, and/or through any other suitable means, or may be individually connected. In various embodiments, browser 106 may comprise a web browser (e.g., MICROSOFT INTERNET EXPLORER®, GOOGLE CHROME®, etc.), an application, a micro-app or mobile application (e.g., downloaded via APPLE® APP STORE®, GOOGLE PLAY®, etc.), or the like, configured to allow user 102 to access and interact with security provider system 112 and/or blockchain network 120 (e.g., via crypto-wallet 108 and security provider plugin 110).

For example, the user 102 may interact with security provider system 112, via browser 106 of user device 104, to receive content, execute transactions, and/or the like. User device 104 may be in electronic communication with security provider system 112 and/or blockchain network 120, and may comprise any suitable hardware, software, and/or database components capable of sending, receiving, and storing data. User device 104 may comprise any number of software components installed on user device 104 and configured to allow user 102 to interact with security provider system 112 and/or blockchain network 120 via a web page or an internet of things.

In various embodiments, security provider system 112 may comprise a controller 114, a crypto module 116, and a repository 118. The aforesaid elements may be in direct logical communication with each other via a bus, network, and/or through any other suitable means, or may be individually connected. Security provider system 112 may comprise any suitable combination of hardware, software, and/or database components. For example, may comprise one or more network environments, servers, computer-based systems, processors, databases, and/or the like. Security provider system 112 may comprise at least one computing device in the form of a computer or processor, or a set of computers/processors, although other types of computing units or systems may be used, such as, for example, a server, web server, pooled servers, or the like. Security provider system 112 may also include one or more data centers, cloud storages, or the like, and may include software, such as APIs, SDKs, etc. configured to retrieve and write data to the user device 104, browser 106, crypto-wallet 108, and/or security provider plugin 110. In various embodiments, security provider system 112 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, controller 114 may be configured to direct workflow between browser 106 and elements of security provider system 112 such as crypto module 116 and repository 118. Controller 114 may be configured to provide software, services, and interfaces to enable communications between security provider system 112, security provider plugin 110, crypto module 116, and repository 118. In various embodiments, controller 114 may include programmatic libraries configured to translate and transmit queries and commands from security provider system 112 to browser 106 and/or crypto-wallet 108. For example, controller 114 may be configured to receive account creation information such as a user name, a user address, etc., from browser 106. Controller 114 may be configured to encrypt data and thereby generate a secure channel 122 between the security provider system 112 and browser 106 for encrypted communications.

Repository 118 may be configured to communicate with controller 114 and to store and maintain data such as account creation information, hashed account creation information, identification information, encrypted passcodes, and/or the like. Repository 118 may be in operative and/or electronic communication with controller 114 and crypto module 116. Data may be stored in repository 118 in response to commands from controller 114. Data may be stored in repository 118 using any suitable technique described herein or known in the art.

Crypto module 116 may be configured to encrypt, decrypt, and/or hash data in response to commands from controller 114. In various embodiments, crypto module 116 may hash data via a one-way hashing function and, in this regard, may generate a unique hash as a function of the input data. Crypto module may be configured to encrypt data via an encryption algorithm which is function of an input plaintext (i.e., the data to be encrypted) and a hashed data which may be a key to recover the plaintext.

Figure 2:
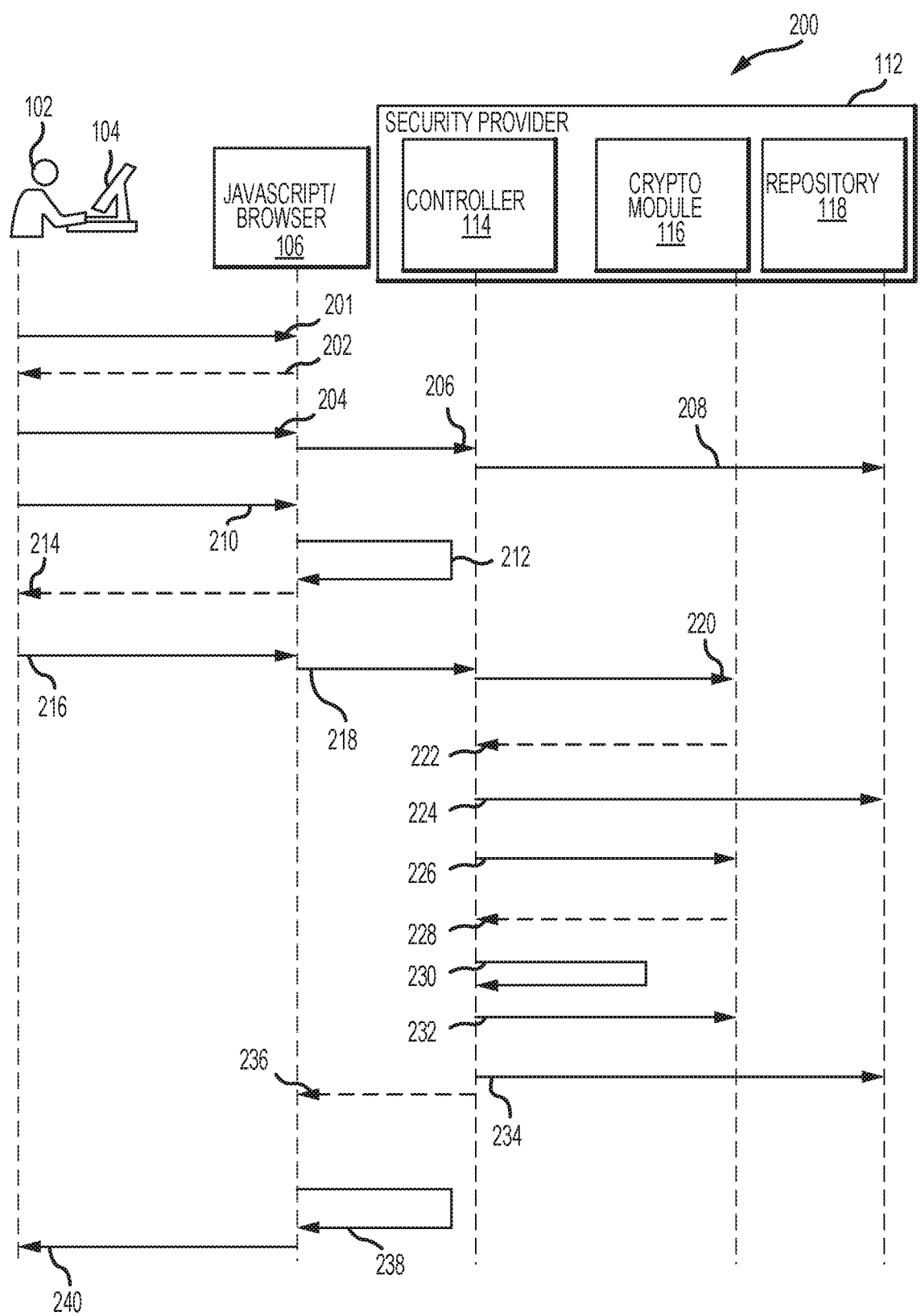
FIG. 2 illustrates an exemplary process flow for user registration in a hybrid identity service system, in accordance with various embodiments.
Figure 3:
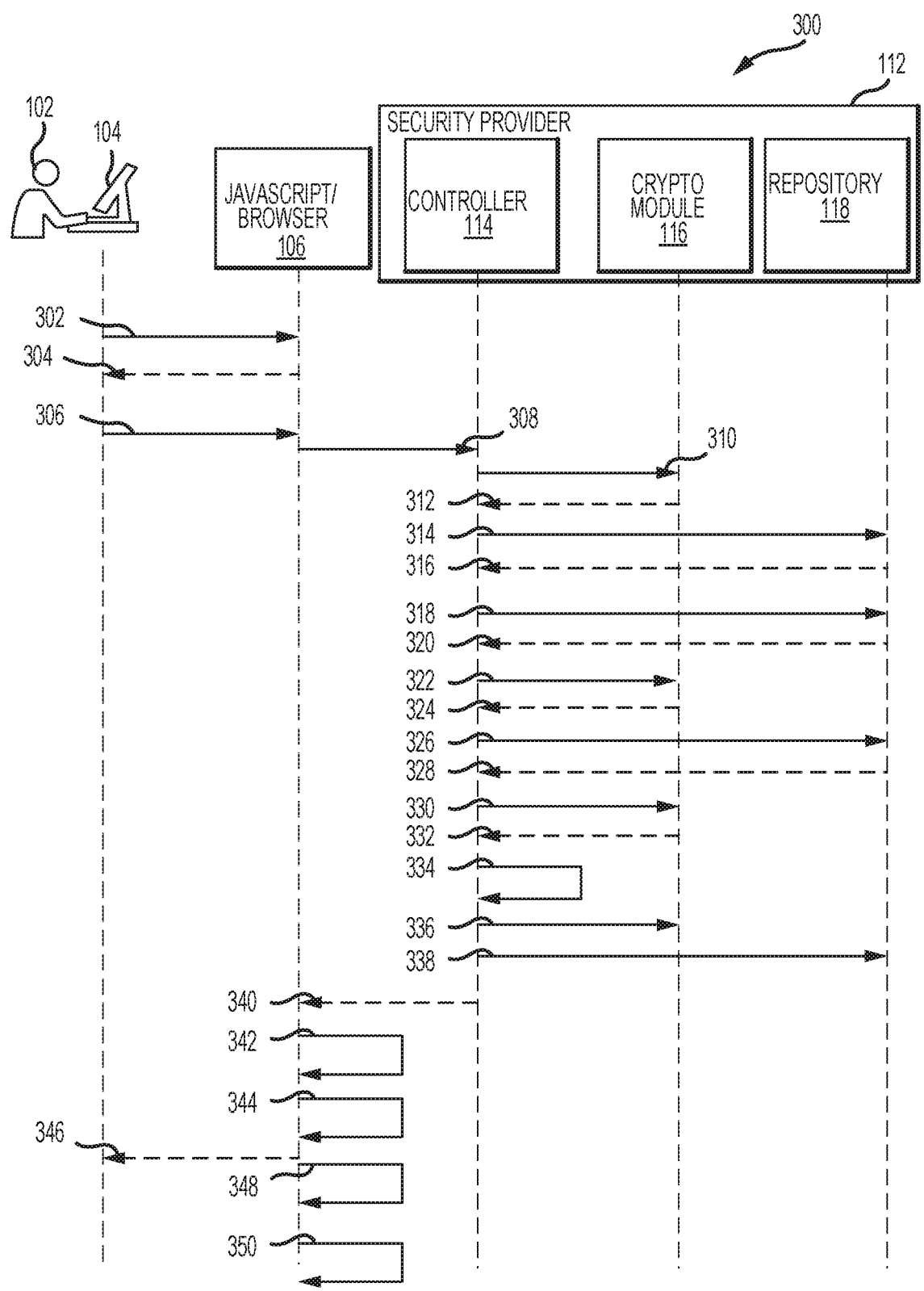
FIG. 3 illustrates an exemplary process flow for executing a transaction in a hybrid identity service system, in accordance with various embodiments.

Referring now to FIGS. 2 and 3, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 2 and 3, but also to the various system components as described above with reference to FIG. 1.

With reference to FIG. 2, a process flow 200 for user registration in a hybrid identity service system is illustrated, according to various embodiments. User 102 via user device 104 accesses an account creation portal of security provider system 112 through browser 106 and transmits an account creation request (step 201). The system may prompt the user to input account creation information (e.g., a name, a street address, a phone number, an email address, and/or the like) in response to the account creation request (step 202). Step 202 may include distributing security provider plugin 110 to user device 104. User 102 may input the account creation information in browser 106 via user device 104 (step 204) and browser 106 may pass the account creation information to controller 114 via security provider plugin 110 (step 206). In response to receiving the account creation information, controller 14 may store the account creation information in repository 118 and may prompt the user to create a wallet to be associated with the system (step 208).

Browser 106 may receive a request to create a wallet address (e.g., a blockchain address or a transaction address) (step 210) and, in response, browser based crypto-wallet 108 may generate a key pair including a public key (i.e., the wallet address) and a private key associated with the public key (step 212). Browser 106 may, via security provider plugin 110, prompt the user 102 for a user ID and password to associate with the wallet address (step 214). User 102 may input the user ID and password information in browser 106 via user device 104 (step 216). Browser 106 may pass the user ID and password to controller 114 via security provider plugin 110 (step 218). Controller 114 may pass the user ID and password to crypto module 116 (step 220) and, in response to receiving the user ID and password, crypto module 116 may hash the user ID and password to produce a password hash (step 222). Controller 114 may save the password hash in the repository 118 as a stored password hash (step 224). In various embodiments, step 224 may include associating the stored password hash with the account creation information.

In various embodiments, controller 114 may also command crypto module 116 to hash the account creation information (step 226). In response to the request, crypto module 116 may retrieve the stored account creation information and may hash the account creation information to produce a hashed account information which may be passed back to controller 114 (step 228). In response the hashed account information, controller 114 may generate a unique passcode (e.g., a first passcode) (step 230). In various embodiments, step 230 may include controller 114 associating the passcode with the password hash and/or the hashed account information. Step 230 may also include controller 114 determining whether the password hash is associated with another unique passcode (i.e., a second passcode). In various embodiments, the passcode may be a random number and/or string of characters of arbitrary length to ensure security. The passcode may be generated according to pre-established rules such as, for example, 'include mixed case and special characters' or, for example, 'include at least 16 characters' and/or the like.

In response to generating the passcode, controller 114 may command crypto module 115 to encrypt the passcode using the hashed account information as a key to generate an encrypted passcode (step 232). The encrypted passcode may then be saved in repository 118 (step 234). Controller 114 may then pass the plaintext passcode to browser 106 (step 236). The plaintext passcode may be passed by controller 114 to browser 106 via encrypted tunnel between security provider plugin 110 and security provider system 112, and browser based crypto-wallet 108 may encrypt the private key using the passcode (step 238) to generate an encrypted private key. In various embodiments, the browser 106 may prompt the user 102 to save the passcode in cold storage.

With additional reference to FIG. 3, a process flow 300 for executing transactions in a hybrid identity service system is illustrated, according to various embodiments. User 102 may initiate the transaction process by generating a transaction request on user device 104 via browser 106 such as, for example, sending a payment from crypto-wallet 108 (step 302). In response to the transaction request, the system via security provider plugin 110 of browser 106 may prompt user 102 to enter the user ID and password (step 304). User 102 may input the user ID and password in browser 106 via user device 104 (step 306) and browser 106 may pass the user ID and password to controller 114 via security provider plugin 110 (step 308). Controller 114 may pass the user ID and password to crypto module 116 (step 310) and, in response to receiving the user ID and password, crypto module 116 may hash the user ID and password to produce a password hash which is returned to the controller 114 (step 312).

Controller 114 may compare the password hash with one or more password hashes stored in repository 118 and determine whether the password hash matches the stored password hash (step 314). Repository 118 may return a match confirmation message in the event of a match (step 316) and controller 114 may request the associated account creation information from repository 118 in response (step 318). In response to the request for the associated account creation information, repository 118 may return the account creation information to the controller 114 (step 320). Controller 114 may also command crypto module 116 to hash the account creation information (step 322). In response to the request, crypto module 116 may hash the account creation information to generate the hashed account information which may be passed back to controller 114 (step 324). In response to the hashed account information, controller 114 may request the encrypted passcode associated with the hashed account information in repository 118 (step 326) and repository 118 may return the encrypted passcode (step 328).

Controller 114 may pass a decryption request including the encrypted passcode (i.e., a first encrypted passcode) and the hashed account information to the crypto module 116 (step 330) and crypto module 116 may return the plaintext passcode (i.e., a first passcode) (step 332). In response to the plaintext passcode, controller 114 may generate a new passcode (i.e., a second passcode) as described above (step 334). Controller 114 may command crypto module 116 to encrypt the new passcode using the hashed account information as a key thereby generating a new encrypted passcode (i.e., a second encrypted passcode) (step 336) which controller 114 may save to repository 118 (step 338). Controller 114 may then pass the plaintext passcode and new passcode to browser 106 (step 340).

The plaintext passcode may be passed by controller 114 to browser 106 via encrypted tunnel between security provider plugin 110 and security provider system 112, and browser based crypto-wallet 108 may decrypt the private key using the plaintext passcode (step 342) to recover the private key. Browser based crypto-wallet 108 of browser 106 may sign the transaction request with the private key and browser 106 may propagate the transaction request to a transaction network (step 344). In response to signing the transaction, browser based crypto-wallet 108 may encrypt the private key using the new passcode to generate the encrypted private key which may then be stored by browser 106 (step 348). In response to encrypting the private key using the new passcode, browser 106 may remove all variables referencing the plaintext private key and passcodes (step 350).

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Referring now to FIGS. 2 and 3 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2 and 3, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS' software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS' operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server, any other application server components or may reside within another computing device or may take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

As used herein, "transmit" may include sending electronic data from one system component to another over a network connection. Additionally, as used herein, "data" may include encompassing information such as commands, queries, files, data for storage, and the like in digital or any other form.

Therefore, the following is claimed:

1. A method, comprising:
   hashing, by a security provider, account creation information associated with a stored password hash to create hashed account creation information;
   decrypting an encrypted first passcode stored in association with the account creation information to generate a first passcode, wherein a cryptowallet on a user device uses the first passcode to perform cryptographic processes on one or more keys stored by the cryptowallet on the user device, wherein an encrypted private key is at least one of the one or more keys;
   generating, by the security provider, a second passcode in response to decrypting the encrypted first passcode, wherein the first passcode is different from the second passcode, wherein the cryptowallet on the user device uses the second passcode to perform cryptographic processes on the one or more keys stored by the cryptowallet on the user device;
   encrypting, by the security provider, the second passcode using the hashed account creation information as an encryption key to create an encrypted passcode;
   returning, by the security provider, the first passcode and the second passcode to the cryptowallet on the user device;
   decrypting, by the user device via the cryptowallet, the encrypted private key using the returned first passcode to generate a decrypted private key;
   signing, by the user device via the cryptowallet, a transaction request with the decrypted private key; and
   in response to signing the transaction request, re-encrypting, by the user device via the cryptowallet, the decrypted private key using the returned second passcode.

2. The method of claim 1, further comprising storing, by the security provider, the encrypted passcode in association with the account creation information.

3. The method of claim 1, further comprising receiving, by the security provider, a user identifier and a password from the user device, wherein the user identifier and password are received from a browser executing on the user device and the first passcode and the second passcode are returned to the browser via an encrypted channel.

4. The method of claim 1, wherein generating the second passcode further comprises generating a random string of numbers and characters of arbitrary length according to at least one pre-established rule.

5. The method of claim 1, further comprising receiving, by the security provider, the account creation information comprising at least one of a username, a user address, a phone number, or an email address.

6. The method of claim 3, further comprising hashing, by the security provider, the user identifier and the password to produce a password hash; and comparing, by the security provider, the password hash to a stored password hash to determine that the password hash matches the stored password hash, wherein the stored password hash is stored in a repository of the security provider.

7. The method of claim 1, wherein generating the second passcode further comprises generating a random string of special characters and mixed case characters according to at least one pre-established rule.

8. The method of claim 1, further comprising prompting, by the security provider, the user device to create the cryptowallet.

9. The method of claim 8, wherein the security provider prompts the user device to create the cryptowallet in response to receiving a user identifier and a password from the user device.

10. The method of claim 3, further comprising removing variables referencing the first passcode and the second passcode.

11. A system, comprising:
    a user device comprising a first processor, a first memory, first machine-readable instructions stored in the first memory, and a cryptowallet stored in the first memory;
    a computing device comprising a second processor, a second memory, and second machine-readable instructions stored in the second memory, the second machine-readable instructions, when executed by the second processor, cause the computing device to at least:
    hash account creation information associated with a stored password hash to create hashed account creation information;
    decrypt an encrypted first passcode stored in association with the account creation information to generate a first passcode;
    generate a second passcode in response to decrypting the encrypted first passcode, wherein the first passcode is different from the second passcode;
    encrypt the second passcode using the hashed account creation information as an encryption key to create an encrypted passcode; and
    return the first passcode and the second passcode to the cryptowallet on the user device; and
    wherein the cryptowallet uses the first passcode to perform cryptographic processes on one or more keys stored by the cryptowallet, an encrypted private key is at least one of the one or more keys, the cryptowallet uses the second passcode to perform cryptographic processes on the one or more keys stored by the cryptowallet, and the first machine-readable instructions, when executed by the first processor, cause the first processor to at least:
    decrypt, via the cryptowallet, the encrypted private key using the returned first passcode to generate a decrypted private key;
    sign, via the cryptowallet, a transaction request with the decrypted private key; and
    in response to signing the transaction request, re-encrypt, via the cryptowallet, the decrypted private key using the returned second passcode.

12. The system of claim 11, wherein the second machine-readable instructions, when executed by the second processor, further cause the computing device to at least store the encrypted passcode in association with the account creation information.

13. The system of claim 11, wherein the second machine-readable instructions, when executed by the second processor, further cause the computing device to at least receive a user identifier and a password from a browser executing on the user device and the first passcode and the second passcode are returned to the browser via an encrypted channel.

14. The system of claim 11, wherein the second machine-readable instructions that, when executed by the second processor, cause the computing device to generate the second passcode further cause the computing device to generate a random string of numbers and characters of arbitrary length according to at least one pre-established rule.

15. The system of claim 11, wherein the second machine-readable instructions, when executed by the second processor, further cause the computing device to at least receive the account creation information comprising at least one of a username, a user address, a phone number, or an email address.

16. The system of claim 13, wherein the second machine-readable instructions, when executed by the second processor, further cause the computing device to at least hash the user identifier and the password to produce a password hash; and compare the password hash to a stored password hash to determine that the password hash matches the stored password hash, wherein the stored password hash is stored in a repository of the computing device.

17. The system of claim 11, wherein the second machine-readable instructions that, when executed by the second processor, cause the computing device to generate the second passcode further cause the computing device to at least generate a random string of special characters and mixed case characters according to at least one pre-established rule.

18. The system of claim 11, wherein the second machine-readable instructions that, when executed by the second processor, further cause the computing device to at least prompt the user device to create the cryptowallet.

19. The system of claim 18, wherein the second machine-readable instructions that cause the computing device to at least prompt the user device to create the cryptowallet are executed in response to receiving a user identifier and a password from the user device.

20. The system of claim 13, wherein the browser removes variables referencing the first passcode and the second passcode.

* * * * *